US008755301B2

(12) United States Patent
Pattersson et al.

(10) Patent No.: US 8,755,301 B2
(45) Date of Patent: \*Jun. 17, 2014

(54) SYSTEM AND METHOD OF MODIFYING COMMUNICATIONS POLICY SETTINGS IN A WIRELESS NETWORK

(71) Applicant: Research In Motion Limited, Waterloo (CA)

(72) Inventors: Ian Michael Pattersson, Petersburg (CA); Sean Arthur Daniel Carlos Goggin, Waterloo (CA); Marc Plumb, Kitchener (CA)

(73) Assignee: BlackBerry Limited, Waterloo (CA)

( * ) Notice: Subject to any disclaimer, the term of this patent is extended or adjusted under 35 U.S.C. 154(b) by 26 days.

This patent is subject to a terminal disclaimer.

(21) Appl. No.: 13/742,696

(22) Filed: Jan. 16, 2013

(65) Prior Publication Data

US 2013/0130664 A1 May 23, 2013

Related U.S. Application Data

(63) Continuation of application No. 11/195,618, filed on Aug. 3, 2005, now Pat. No. 8,363,558.

(51) Int. Cl.
*G01R 31/08* (2006.01)

(52) U.S. Cl.
USPC ......................................................... 370/252

(58) Field of Classification Search
USPC .................. 370/252, 280; 455/456.1; 709/227
See application file for complete search history.

(56) References Cited

U.S. PATENT DOCUMENTS

| 6,421,325 | B1 * | 7/2002 | Kikinis ..................... 370/280 |
| 7,263,367 | B1 * | 8/2007 | Sabot ....................... 455/456.1 |
| 8,363,558 | B2 * | 1/2013 | Plumb et al. ................. 370/252 |
| 2003/0236890 | A1 * | 12/2003 | Hurwitz et al. .............. 709/227 |

OTHER PUBLICATIONS

U.S. Appl. No. 11/195,618, filed Aug. 3, 2005 now Patent No. 8,363,558 Title: System and Method of Modifying Communications Policy Settings in a Wireless Network.

\* cited by examiner

*Primary Examiner* — Mark Rinehart
*Assistant Examiner* — Gbemileke Onamuti
(74) *Attorney, Agent, or Firm* — Perry + Currier Inc.; Kristjan Spence (57) ABSTRACT

The present invention provides a system and method of modifying policy settings in a network having a plurality of subscriber devices. An embodiment includes a plurality of base stations, each capable of wirelessly transmitting across a geographic region. A cell-phone, capable of roaming between regions is operable to establish a wireless link with the base stations. The network contains a communication policy determining from which other communication devices a subscriber device can receive voice calls. A copy of this policy is stored on each subscriber device as a database and periodically updated as the devices make contact with the base stations or other subscriber devices. When receiving a voice call, the device first determines who the originator of the call is and then determines whether it is allowed to receive the call from that originator according to its policy database. The policy database can be updated either by subscriber devices or by base stations.

6 Claims, 8 Drawing Sheets

SYSTEM AND METHOD OF MODIFYING COMMUNICATIONS POLICY SETTINGS IN A WIRELESS NETWORK

FIELD OF THE INVENTION

The present invention relates generally to wireless telecommunication and more particularly to a system and method for modifying communications policy in a wireless network.

BACKGROUND OF THE INVENTION

Mobile telephonic devices ("cell-phones") capable of wireless communications are increasingly commonplace. Cell-phones typically integrate a variety of functionality into a single device, but the ability to carry out voice telecommunications remains central to the devices' purpose. Nokia of Keilalandentie 2-4, Finland and Motorola Inc. of Schaumburg, Ill., U.S.A. are two examples of manufacturers of such cell-phones, and each offer a variety of products in this category.

A typical cell-phone contains a communications interface for establishing wireless communications with telephony networks ("wireless networks"). In addition, a typical cell-phone also has a microcomputer which controls most of the functionality of the cell-phone and aids in processing information that the cell-phone is presented with.

As part of its functionality, a cell-phone is called upon to establish communications with the wireless networks by accessing different network base stations as the user of the cell-phone roams through different geographic regions served by these base stations. Accordingly, a cell-phone is able to establish communications with other communications devices through the wireless network, allowing the cell-phone to place calls to and to receive calls from these other devices.

As the volume of communications in wireless networks grows, so does the volume of unwanted and unsolicited communications. These communications usually originate from mass marketing sources, but can be from other entities as well. Unwanted calls, in addition to being inconvenient, can be costly as well. For example, long distance marketing calls, which due to the cost structure of Voice over IP have now become more feasible, are costly since, typically, cell-phone owners pay long distance charges for long distance calls received as well as placed.

There has been at least one attempt to devise a scheme for blocking unwanted calls. Specifically, an internet marketing brochure (http://www.hackcanada.com/canadian/phreaking/bcps1.html) discloses a call blocking service allowing the called party to divert up to twelve telephone numbers of their choice to a special recording that tells callers that the party they have reached has chosen not to take their call at this time. Numbers on the list can be altered by the subscriber at any time. This attempt, however, has several limitations. First of all, each subscriber's blocking list must be manually updated by each subscriber individually. Moreover, only a small number of calling numbers can be blocked. Finally, the call is diverted to a voice mail, which verifies the existence of that phone number to the caller. Bypassing this scheme, therefore, is relatively straightforward: if the initial attempt at placing an unwanted call is frustrated, the unwanted caller simply has to repeat the call using a new originating number. Given the limited number of phone numbers that can be blocked, and the manual nature of updating these by each subscriber, after several attempts, the caller is likely to reach most of the subscribers using this service. Moreover, according to this scheme, the caller's initial efforts are not altogether fruitless since even the diverted calls serve to verify the existence of a subscriber's phone number because of the voice mail.

SUMMARY OF THE INVENTION

It is an object of the present invention to provide a novel system and method for secure access that obviates or mitigates at least one of the above-identified disadvantages of the prior art.

According to an aspect of the invention, there is provided a method of processing communications in a network having a plurality of subscriber devices. The method comprises the steps of: maintaining a policy common to all subscriber devices for determining whether it is permissible to accept voice calls; receiving a voice call at one of the subscriber devices where the voice call has an originator identifier; accessing the common policy; determining a permissibility as to whether the voice call is permissible according to the common policy based on the originator identifier; and accepting or rejecting the call according to the permissibility.

The method can comprise the additional steps of, prior to the accepting step: maintaining an override policy unique to each subscriber device for determining whether it is permissible to accept voice calls based on the originator identifier; accessing the override policy; and altering the permissibility according to the override policy.

Another aspect of the invention provides a method of updating a common communication policy for a network having a plurality of subscriber devices. The method comprises the steps of: receiving a voice call at one of the subscriber devices where the communication has an originator identifier; marking the identifier; and updating the common policy with the identifier chosen at the selecting step such that reception by the plurality of subscriber devices of a voice call having the originator identifier is impermissible.

Another aspect of the invention provides a method of updating an override policy for overriding a common policy for a network having a plurality of subscriber devices. The method comprises the steps of: accessing common policy at one of the subscriber devices where the common policy has at least one identifier such that reception by the plurality of subscriber devices of a voice call having one of the at least one identifier is impermissible; marking at least one of the at least one identifier from the common policy; and updating the override policy associated for the one subscriber device according to the marked at least one identifier.

Another aspect of the invention provides a wireless subscriber device that is part of a communications network having a plurality of subscriber devices. The device typically comprises an interface operable to receive communications. The device also comprises a computer connected to the interface and operable to access a policy. The policy is common to the plurality of subscriber devices. The policy defines originators from which it is permissible for the subscriber devices to accept communications. The microcomputer permits the interface to communicate in accordance with the policy.

According to another aspect of the invention, a server for communicating with at least one subscriber device is provided. The server comprises a microcomputer operable to maintain a common policy defining originators from which it is permissible for the at least one subscriber device to accept communications. The server also comprises an interface for delivering the policy to each of the at least one subscriber device.

BRIEF DESCRIPTION OF THE DRAWINGS

The invention will now be described by way of example only, and with reference to the accompanying drawings, in which.

DETAILED DESCRIPTION OF THE INVENTION

Figure 1:
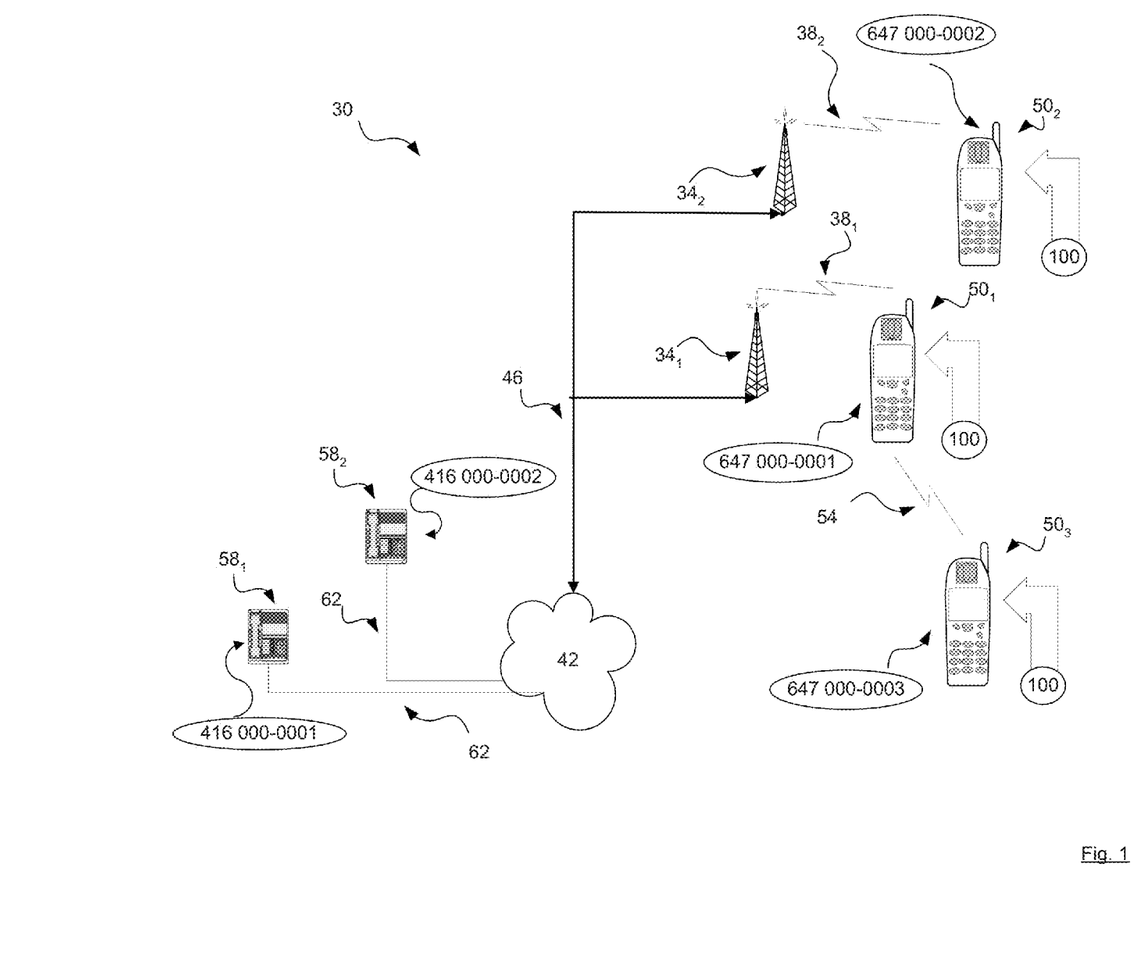
FIG. 1 is a block diagram of a system for modifying communication policy in accordance with an embodiment of the invention.

Referring now to FIG. 1, a wireless communication system in accordance with a first embodiment of the invention is indicated generally at 30. System 30 comprises a plurality of base stations 34 operable to wirelessly transmit across a variety of geographic ranges. Base stations 34 communicate wirelessly over a plurality of links 38. In a present embodiment, links 38 are based on a known voice-based wireless telecommunication such as Global System for Mobile Communications ("GSM") or Advanced Mobile Phone System ("AMPS").

In system 30, base stations 34 are also connected to a network 42 through a connection 46. In this embodiment, network 42 is the public switched telephone network ("PSTN") but, in other embodiments, other types of networks can be employed. Moreover, in this embodiment connection 46 is a fibre-optic wire connection, but in other embodiments connection 46 can be other types of connections such as copper wires or a satellite connection.

System 30 also includes a plurality of subscriber devices 50. In this embodiment, a subscriber device 50 is a cell-phone such as those manufactured by Nokia of Keilalandentie 2-4, Finland and Motorola Inc. of Schaumburg, Ill., U.S.A., but in other embodiments it could have a cell phone and other enhanced functions such as those manufactured by Research In Motion Limited of Waterloo, Ontario, Canada, or by PalmOne, Inc. of Milpitas, Calif. USA. Cell-phones 50 are operable to connect to network 42 via a base station 34's link 38 each time cell-phone 50 is located within a range respective to that access station 34. For example, whenever device 50$_1$ is located within the range of base station 34$_1$, device 50$_1$ can connect to network 42 by linking with base station 34$_1$ through link 38$_1$, and whenever device 50$_2$ is located within the range of base station 34$_2$, device 50$_2$ can connect to network 42 by linking with station 34$_2$ through link 38$_2$. Cell-phones 50 can also communicate with each other directly, without the need for a base station, through a peer-to-peer link 54. In this embodiment, a peer-to-peer link consists of a peer-to-peer IEEE 801.11b/g connection employing voice over IP protocol, but in other embodiments other types of peer-to-peer connections such as infrared and cross-linked wired Ethernet connections could also be used. These and other types of peer-to-peer connections are within the scope of the invention.

System 30 also includes phones 58 connected to network 42 through connections 62. Phone 58 is operable to place and receive phone calls through network 42. In other embodiments, phones 58 could represent multiple phones being operated as a call center from which calls are being placed.

Each call originated by a device carries an originator identifier ("OID"), regardless of whether the call is placed through network 42, a base station 34, or through link 54 in a peer-to-peer mode. In this embodiment, an OID is the phone number assigned to each originator phone 58 or cell-phone 50. However, other types of identifiers such as the name under which a phone 58 is registered or a serial number assigned to a cell-phone by the manufacturer can also be used as OIDs, and such variations are within the scope of this invention.

Figure 2:
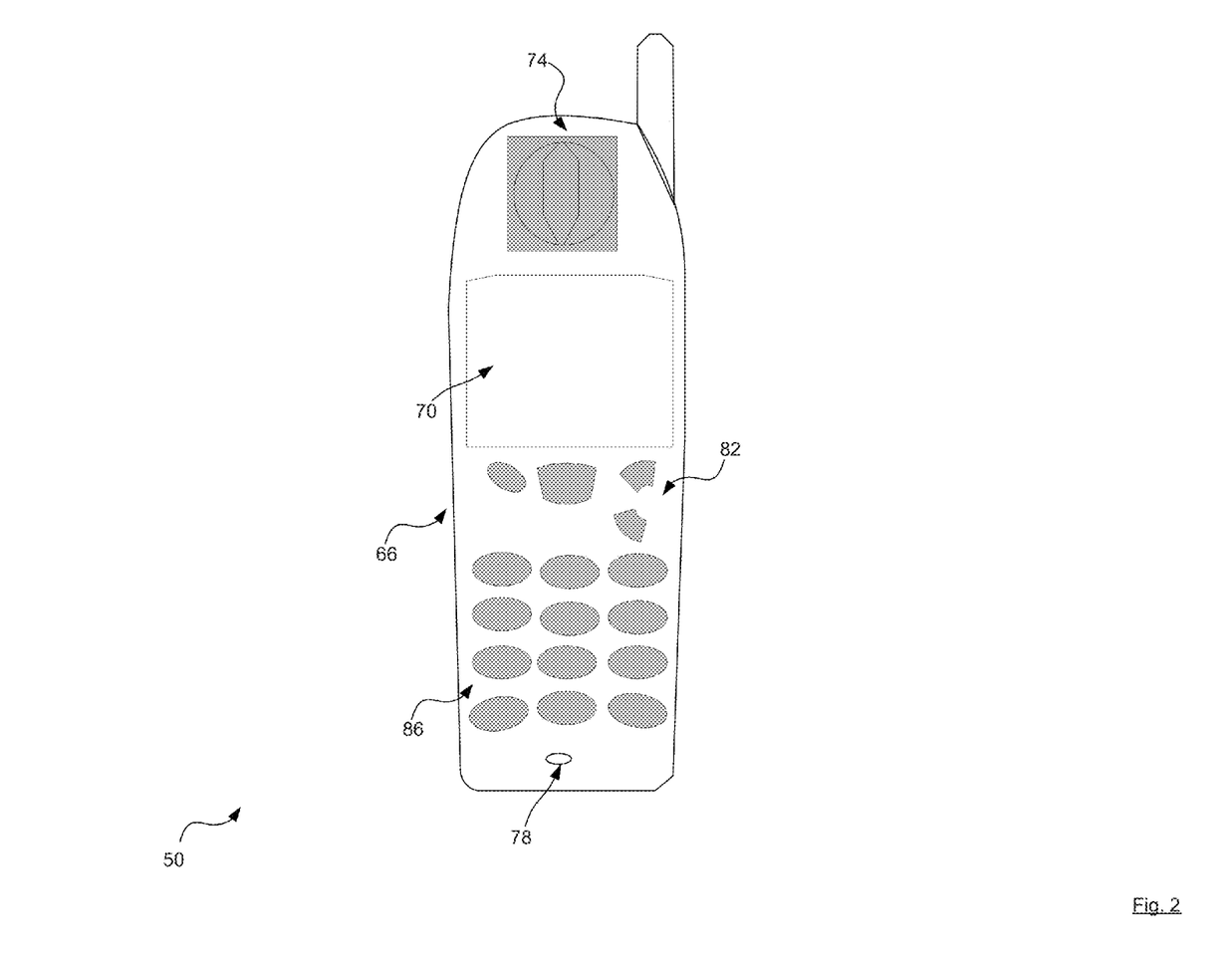
FIG. 2 is a block diagram of the mobile subscriber device of FIG. 1.

Referring now to FIG. 2, cell-phone 50 is shown in greater detail. Cell-phone 50 is based on a computing environment with wireless voice telephony capabilities. (However, it is to be understood that cell-phone 50 can be based on the construction and functionality of any mobile electronic device that can be connected to a wireless network as well. Such devices include personal digital assistants or laptop computers connected to wireless networks. In a present embodiment, a cell-phone 50 includes a housing 66, which frames an LCD display 70, a speaker 74, a microphone 78, scroll buttons 82, and a keyboard 86. It will be understood that housing 66 can be made from any suitable material as will occur to those of skill in the art.)

Figure 3:
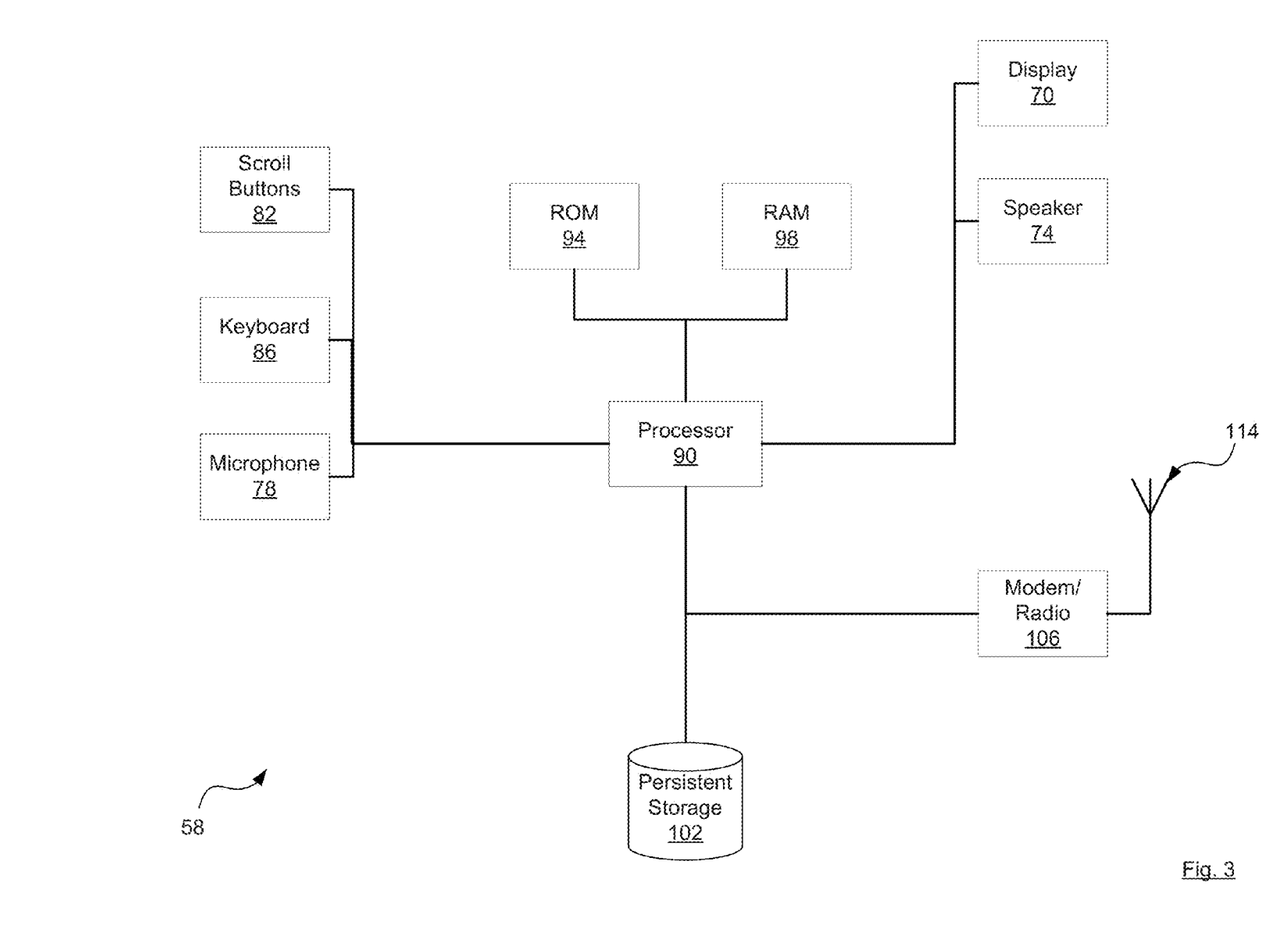
FIG. 3 is a block diagram of certain internal components of a mobile electronic device of FIG. 1.

Referring now to FIG. 3, a block diagram of certain internal components within cell-phone 50 are shown. Cell-phone 50 is based on a microcomputer that includes a processor 90. Processor 90 is connected to a read-only-memory ("ROM") 94, which contains a plurality of applications executable by processor 90 that enables cell-phone 50 to perform certain functions. Processor 90 is also connected to a random access memory unit ("RAM") 98 and a persistent storage device 102 which is responsible for various non-volatile storage functions of cell-phone 50. Processor 90 can send output signals to various output devices including display 70 and speaker 74. Processor 90 can also receive input from various input devices including microphone 78 and keyboard 86. Processor 90 is also connected to a modem and radio 106. Modem and radio 106 are operable to connect cell-phone 50 to wireless base stations 34 in range of cell-phone 50, in the usual manner, via an antenna 114.

Referring back to FIG. 1, each cell-phone 50 maintains a common policy ("CP") database 100, used for determining which received calls should be accepted. CP database 100 is the same for all cell-phones 50. Table I shows an example CP database 100 for cell-phones 50 right before an attempt is made, by phone 58$_1$, to place a call.

TABLE I

| Example CP Database 100 |
|---|
| Field 1 |
| OID |
| 416 000-0002 |
| 647 000-0002 |

Describing Table I in greater detail, Field 1 contains the unique OID associated with a phone or a cell-phone. In this embodiment, as mentioned above, the OID is the phone number associated with a phone or a cell-phone. It is impermissible for cell-phones $50$ to receive calls from phones or cell-phones listed in this table. For example, in this case, it is impermissible for cell-phones $50$ to accept calls placed by phone $58_2$ (which has an OID of 416 000-0002), or by cell-phone $50_2$ (which has an OID of 647 000-0002).

Figure 4:
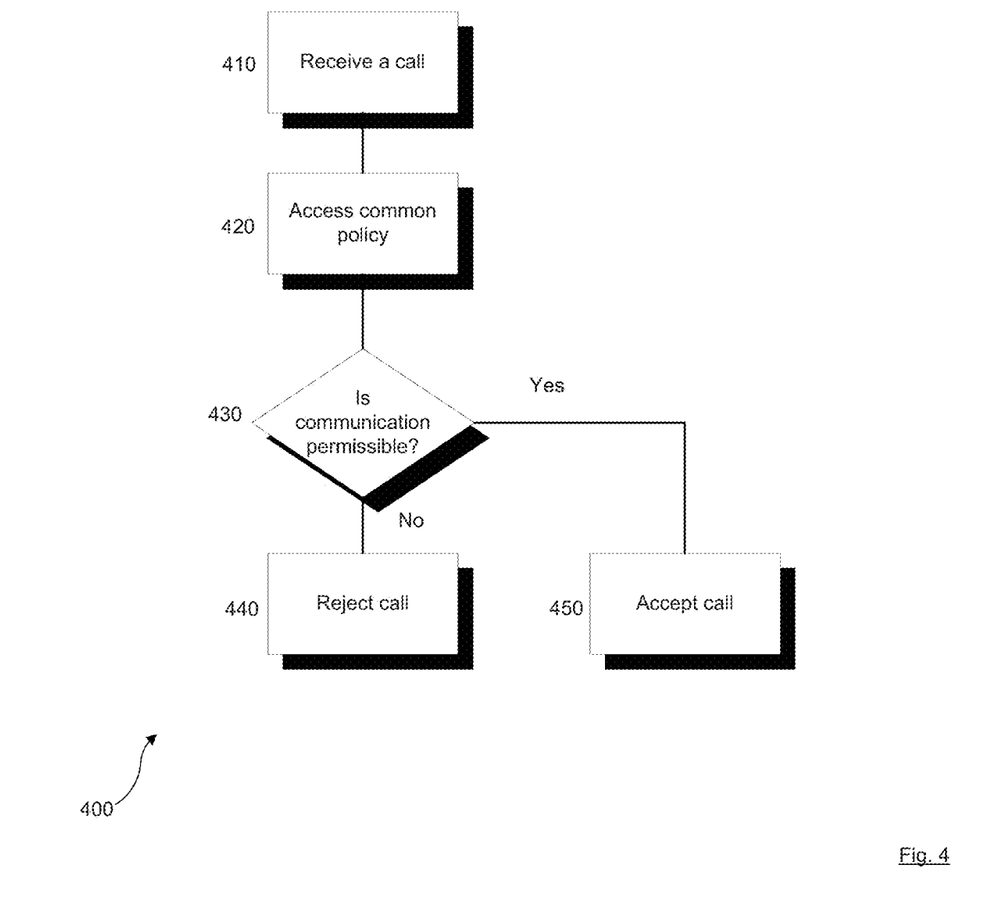
FIG. 4 is a flowchart depicting a method of processing communications in accordance with an embodiment of the invention.

Referring to FIG. 4, a method for processing communications in a network having CP database $100$ is indicated generally at $400$. In order to assist in the explanation of the method, it will be assumed that method $400$ is operated using system $30$, and that, as shown in FIG. 1, cell-phone $50_1$ is located within range of station $34_1$, cell-phone $50_2$ is located within in range of station $34_2$ and cell-phone $50_3$ is located within peer-to-peer range of cell-phone $50_1$. Furthermore, the following discussion of method $400$ will lead to further understanding of system $30$ and its various components. (However, it is to be understood that system $30$ and/or method $400$ can be varied, and need not work exactly as discussed herein in conjunction with each other, and that such variations are within the scope of the present invention).

The current performance of method $400$ is initiated by a call placed by phone $58_1$. Referring back to FIG. 4, at step $410$ a call is received. Step $410$ can be performed, for example, by phone $58_1$ dialing the phone number for cell-phone $50_1$. Accordingly, an attempt is made, in the usual manner, to create a connection with cell-phone $50_1$ through PSTN network $42$, and, with the aid of station $34_1$, through link $38_1$. In the present embodiment, the phone number of phone $58_1$, 416 000-0001, is forwarded to cell-phone $50_1$ as part of the attempt to establish a connection. In other embodiments, other identifiers which uniquely identify the originator of a call in a phone network, such as the name under which a phone is registered, can also be used, and are within the scope of the invention.

Continuing with the example, at step $420$ the common communication policy is accessed. In this example, step $420$ is performed by accessing CP database $100$ maintained on cell-phone $50_1$ itself, as described above. Method $400$ then advances from step $420$ to step $430$, at which point a determination is made as to whether the received communication is permissible. In this example, CP database $100$ is examined to determine whether calls from $58_1$ are permitted. To perform this step, CP database $100$ is accessed to determine whether the phone number of phone $58_1$, the originator phone, is present in CP database $100$. In this case, the phone number 416 000-0001 is not present in CP database $100$ meaning that accepting a phone call from phone $58_1$ is permissible. Accordingly, step $450$ is performed next, and the call is accepted in the usual manner. For example, cell-phone $50_1$'s ringer can be sounded if cell-phone $50_1$ is on, or the call can be directed to a voice mail if cell-phone $50_1$ is off. These and other known manners of accepting a call are within the scope of the invention.

To further illustrate method $400$, it is assumed that method $400$ is performed by system $30$ a second time, but in this second performance, the phone call initiating the performance of method $400$ originates from phone $58_2$. Accordingly, at step $410$ the phone number 416 000-0002, which is associated with phone $58_2$, is transmitted to cell-phone $50_1$ as part of the attempt to establish a connection with phone $50_1$. At step $410$, CP database $100$ is accessed in substantially the same manner as the first performance of method $400$. However, during the second performance of step $430$, accessing CP database $100$ reveals that phone number 416 000-0002 is present in CP database $100$. Accordingly, step $440$ is performed next, rejecting the call placed by phone $58_2$. Step $440$ can be performed in a variety of known ways. For example, the connection can be dropped, a disconnected number message can be played, or the call can be directed to a voice mail informing the originator that calls placed by them cannot be accepted. These and other known manners of rejecting a call are all within the scope of the invention.

In another embodiment, method $400$ can be performed when the call originates from the same network that the receiving cell-phone $50_1$ is located on, which is in contrast to the first two example performances of method $400$ where the call originated on a different network. To illustrate this embodiment, an example is used where the originator is another cell-phone, cell-phone $50_2$ in FIG. 1. Accordingly, when cell-phone $50_2$ attempts to place a call to cell-phone $50_1$, method $400$ is performed in substantially the same manner as the last two example performances. Specifically, the performance of the first two steps leads to the reception of cell-phone $50_2$'s phone number, 647 000-0002, by cell-phone $50_1$, and the accessing of CP database $100$. When step $430$ is performed, a search of CP database $100$ reveals that 647 000-0002 is contained within CP database $100$ leading to the performance of step $440$, namely the rejection of the call.

Although in the previous embodiments the voice call is received from a PSTN and a cellular phone network, in other embodiments, method $400$ can also be performed using other types of connections such as peer-to-peer links; all these embodiments are within the scope of the invention. For example, method $400$ can be performed when a voice communication is attempted between two cell-phones through a peer-to-peer link. To illustrate this embodiment, consider the example shown in FIG. 1 where cell-phone $50_3$ attempts to establish voice communications with $50_1$ through a peer-to-peer link $54$. Accordingly, at step $410$, as in the previous three example performances of method $400$, the phone number associated with cell-phone $50_3$ (647 000-0003), is transmitted to cell-phone $50_1$ as part of an attempt to establish a connection with phone $50_1$. After CP database $100$ is accessed at step $420$, and examined at step $430$, it is found that 647 000-0003 is not in database $100$, and hence, determined that receiving the voice communication from cell-phone $50_3$ is permissible. Thus, method $400$ advances to step $450$ and the voice communication is accepted by cell-phone $50_3$ in the usual manner.

Figure 5:
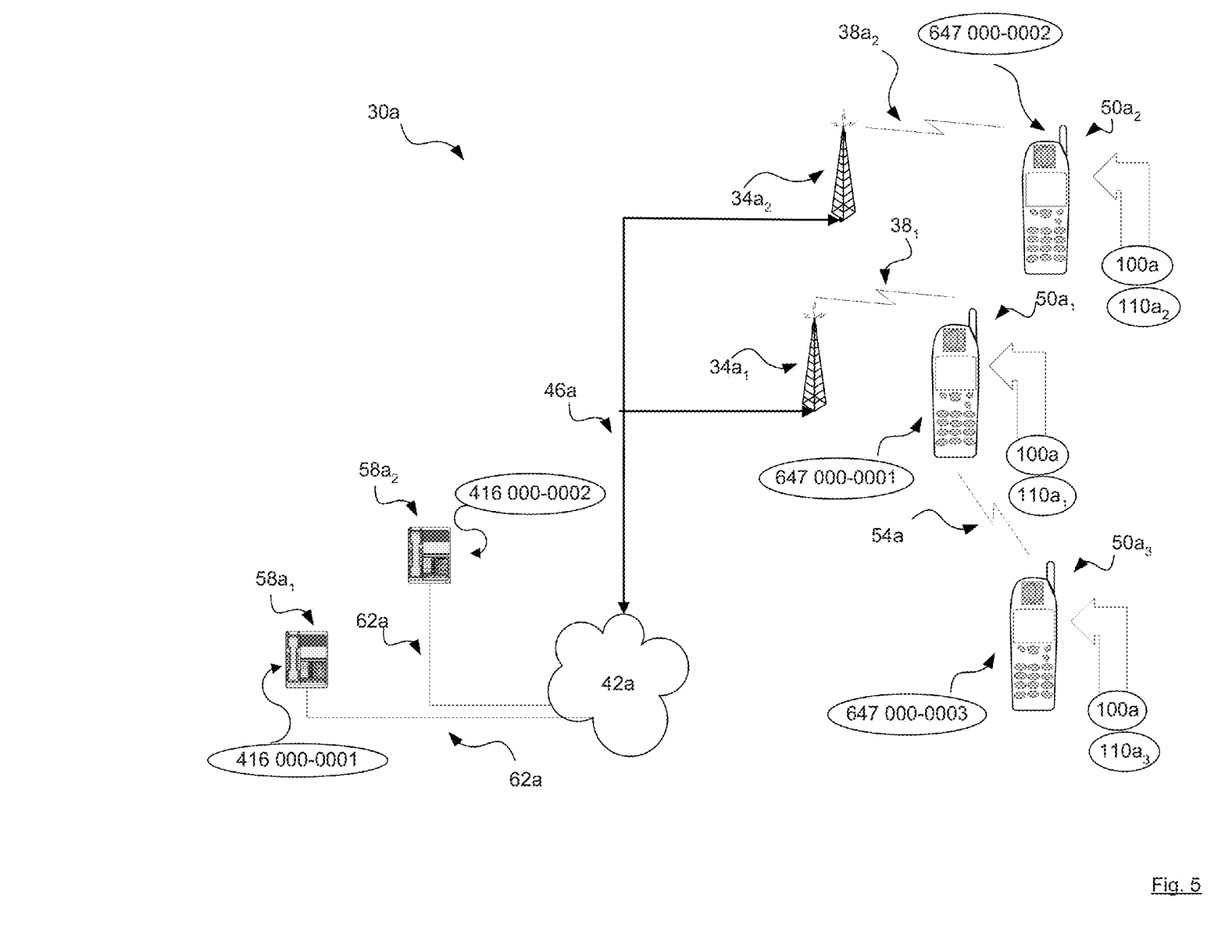
FIG. 5 is a block diagram of a system for modifying communication policy in accordance with another embodiment of the invention.

Referring now to FIG. 5, a wireless communication system in accordance with another embodiment of the invention is indicated generally at $30a$. System $30a$ is substantially the same as system $30$, and like elements in system $30a$ bear the same reference as like elements in system $30$, except followed by the suffix "a". System $30a$ differs from system $30$ in that in system $30a$ each cell-phone $50a$ maintains an override policy ("OP") database $110a$ unique to that cell-phone $50a$. In the present example, OP database $110a$ is an opt-out policy database used for determining whether, for a given call, the common policy contained in CP database $100$ should be opted out of.

Referring back to FIG. 5, each cell-phone $50a$ maintains two policies, one in OP database $110a$, and the other in CP database $100a$. An example CP database $100a$ is shown above in Table I. Table II shows an example OP database $110a_1$ for cell-phone $50a_1$ right before an attempt is made, by phone $58a_2$, to place a call.

TABLE II

Example CP Database 110 for 50a₁

| Field 1 |
| --- |
| OID |
| 647 000-0002 |

Describing Table II in greater detail, Field 1 contains the unique OID associated with a phone 58a or a cell-phone 50a. In this embodiment, as mentioned above, the OID is the phone number associated with a phone 58a or a cell-phone 50a. If a phone 58a or cell-phone 50a is identified in OP database 110a, the common policy represented by CP database 100a is ignored for that device. For example, although, according to common policy 100a, as shown in Table I, it is impermissible for cell-phones 50a to accept calls placed by phone $58_2$ (which has an OID of 416 000-0002), the same OID is also listed in OP database $110a_1$, overriding CP database 100a and making the reception of calls from phone $58_2$ permissible for cell-phone $50a_1$.

Figure 6:
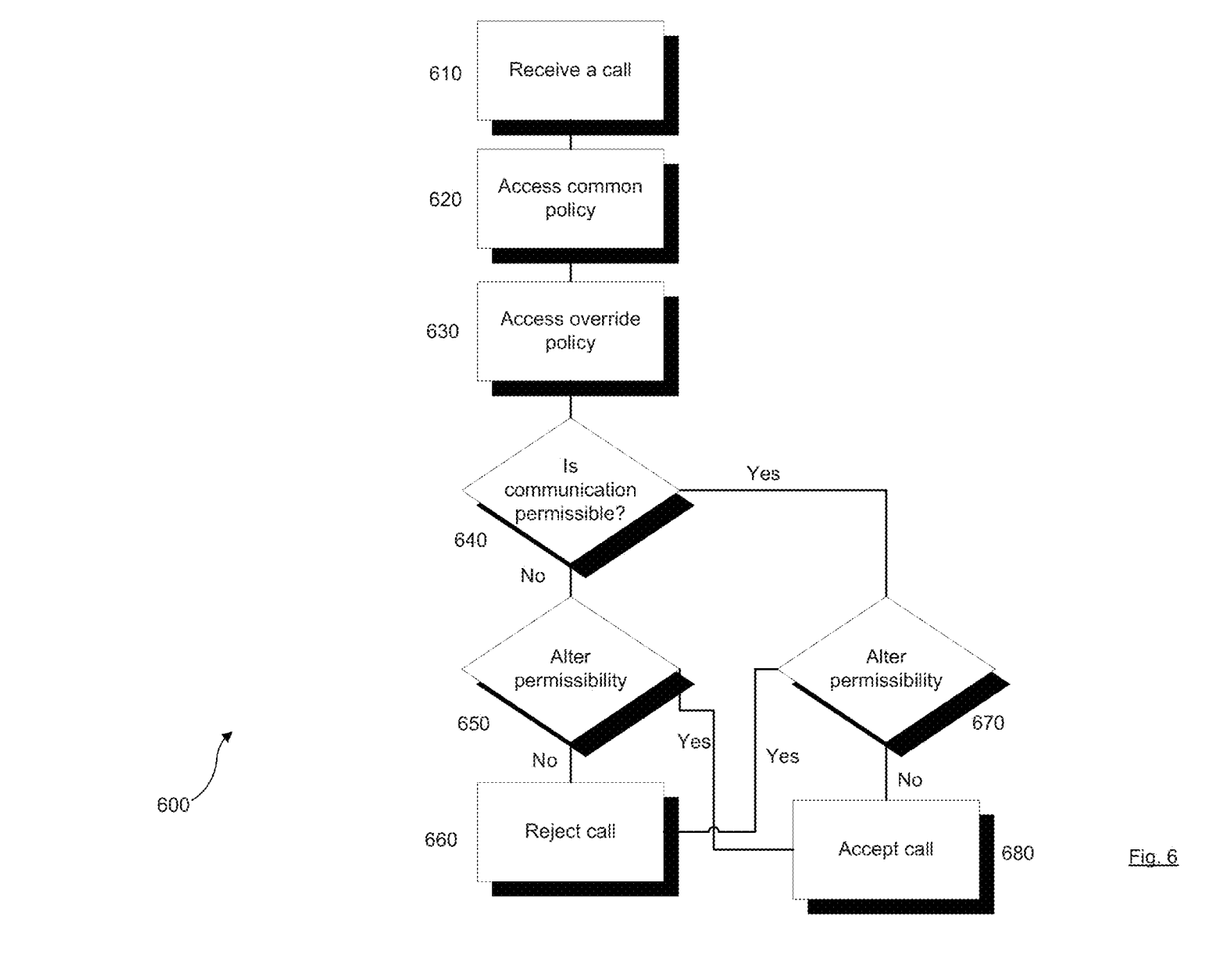
FIG. 6 is a flowchart depicting a method of processing communications in accordance with another embodiment of the invention.

Referring to FIG. 6, a method for processing communications in a network having CP database 100a and OP databases 110a is indicated generally at 600. In order to assist in the explanation of the method, it will be assumed that method 600 is operated using system 30a. Furthermore, the following discussion of method 600 will lead to further understanding of system 30a and its various components. (However, it is to be understood that system 30a and/or method 600 can be varied, and need not work exactly as discussed herein in conjunction with each other, and that such variations are within the scope of the present invention).

Similar to the second example performance of method 400 using system 30, the current performance of method 600 is initiated by a call placed by phone $58a_2$. Accordingly, the performance of steps 610 and 620 result in the reception of phone $58a_2$'s associated phone number and the accessing of CP database 100a. Continuing with the example, at step 630 the override policy is accessed. In this example, step 630 is performed by accessing OP database $110a_1$ maintained on cell-phone $50a_1$ itself Method 600 then advances from step 630 to step 640, at which point a determination is made as to whether the received voice call is permissible. In this example, CP database 100a is examined to determine whether calls from $58a_2$ are permitted. To perform this step, database 100a is accessed to determine whether the phone number of phone $58a_2$, the originator phone, is present database 100a. In this case, the phone number 416 000-0002 is present in database 100a meaning that accepting a phone call from phone $58a_2$ is not permissible. Accordingly, step 650 is performed next.

At step 650, a determination is made whether to alter the permissibility of the call. In this example, OP database 110a is examined to determine whether the common policy for $58a_2$ should be ignored. To perform this step, database 110a is examined to determine whether the phone number of phone $58a_2$, the originator phone, is present database 110a. In this case, the phone number 416 000-0002 is present in CP database 110a, meaning that the common policy should be ignored, altering the permissibility determined at step 640 to make a phone call from phone $58a_2$ permissible. Accordingly, step 680 is performed next.

At step 680 the call is accepted in the usual manner. For example, cell-phone $50_1$'s ringer can be sounded if cell-phone $50_1$ is on, or the call can be directed to a voice mail if cell-phone $50_1$ is off. These and other known manners of accepting a call are within the scope of the invention.

In another embodiment, OP database 110a can represent an opt-in policy used for determining whether, for a given call, the common policy contained in CP database 100a should be followed. For example, according to common policy 100a, as shown in Table I, it is impermissible for cell-phones 50a to accept calls placed by phone $58_2$ (which has an OID of 416 000-0002). The same OID is also listed in OP database $110a_1$, opting in to the policy contained in CP database 100a and making the reception of calls from phone $58_2$ impermissible for cell-phone $50a_1$.

Referring back to FIG. 6, a second example performance of method 600 will be used to illustrate an embodiment of method 600 where OP database 110a represents an opt-in policy. As in the first Performance of method 600 where OP database 110a represents an opt-out policy, it is assumed that this performance of method 600 is initiated by call placed by phone $58a_2$. It should be noted that the performance of method 600, regardless of the type of policy represented by OP database 110a, is the same except for the determination of whether to alter permissibility at steps 650 and 670. Accordingly, the performance of steps 610 through 630 according to this embodiment results in the reception of phone $58a_2$'s associated phone number, the accessing of CP database 100a, and the OP database $100a_1$.

Method 600 then advances from step 630 to step 640, at which point a determination is made as to whether the received voice call is permissible. In this example, similar to the first performance of method 600, CP database 100a is examined to determine that calls from $58a_2$ are not permissible. Accordingly, step 650 is performed next.

At step 640, a determination is made whether to alter the permissibility of the call. In this example, OP database 110a is examined to determine whether the common policy for $58a_2$ should be followed. To perform this step, database 110a is searched to determine whether the phone number of phone $58a_2$, the originator phone, is present in database 110a; only if OP database 110a also contains the phone number of phone $58a_2$, will the common policy making a call from phone $58a_2$ impermissible be enforced. In this case, phone number 416 000-0002 is present in CP database 110a, meaning that the common policy should be followed, requiring no alterations to the permissibility determined at step 640. Accordingly, step 680 is performed next.

At step 680 the call is rejected. Specifically, the call placed by phone $58_2$ is rejected. Step 680 can be performed in a variety of known ways. For example, the connection can be dropped, or the call can be directed to a voice mail informing the originator that calls placed by them cannot be accepted. These and other known manners of rejecting a call are all within the scope of the invention.

As with method 400, in other embodiments, method 600 can be performed when the call originates from the same network that the receiving cell-phone $50_1$ is located on. Moreover, in yet other embodiments, method 600 can also be performed using other types of connections such as peer-to-peer links. All these embodiments are within the scope of the invention.

Figure 7:
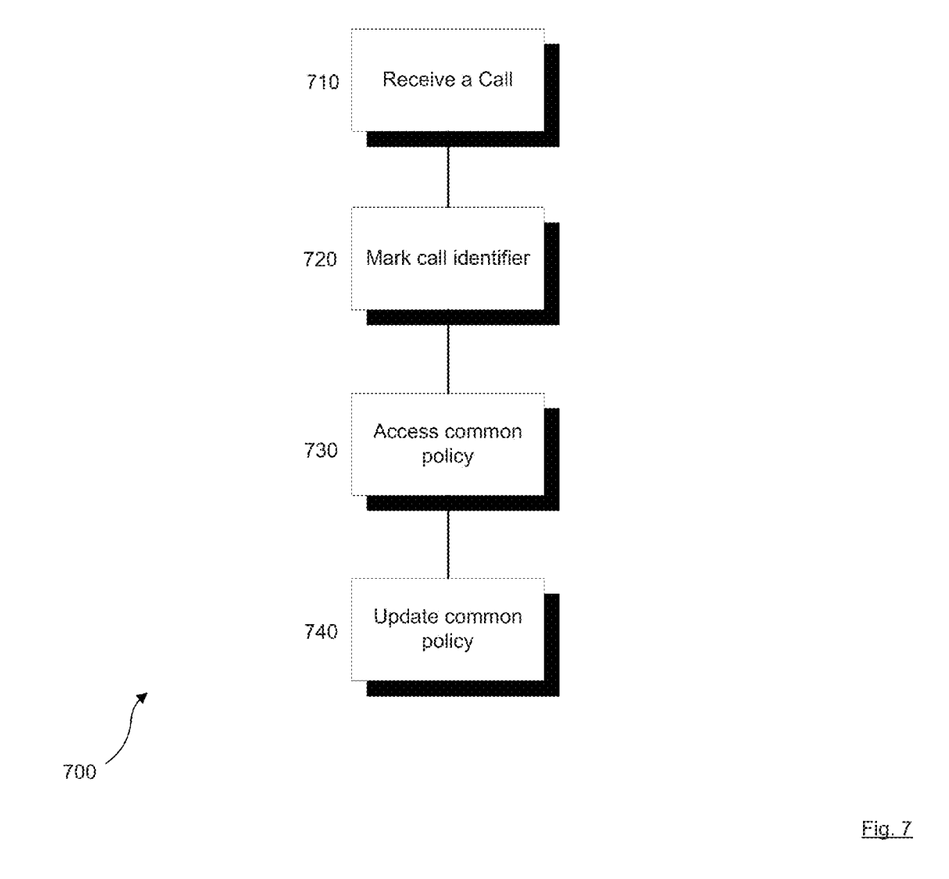
FIG. 7 is a flowchart depicting a method of updating information in accordance with an embodiment of the invention.

Referring to FIG. 7, a method for updating a common communication policy for a network having a plurality of cell-phones is indicated generally at 700. In order to assist in the explanation of the method, it will be assumed that method 700 is operated using system 30, and that, as shown in FIG. 1, cell-phone $50_1$ is located within range of station $34_1$, cell-phone $50_2$ is located within in range of station $34_2$ and cell-phone $50_3$ is located within peer-to-peer range of cell-phone $50_1$. In addition, it is assumed that, immediately prior to the performance of Method 700, CP database 100's contents are as shown in Table I above. Furthermore, the following discussion of method 700 will lead to further understanding of system 30 and its various components. (However, it is to be understood that system 30 and/or method 700 can be varied, and need not work exactly as discussed herein in conjunction with each other, and that such variations are within the scope of the present invention).

The current performance of method 700 is initiated by a call placed by phone $58_1$. Referring back to FIG. 7, at step 710 a call is received. Step 710 can be performed, for example, by phone $58_1$ dialing the phone number for cell-phone $50_1$. Accordingly, an attempt is made, in the usual manner, to create a connection with cell-phone $50_1$, through PSTN network 42, and, with the aid of station $34_1$, through link $38_1$. In the present embodiment, the phone number of phone $58_1$, 416 000-0001, is forwarded to cell-phone $50_1$ as part of the attempt to establish a connection. In other embodiments, other identifiers which uniquely identify the originator of a call in a phone network, such as the name under which a phone is registered, can also be used, and are within the scope of the invention.

Continuing with the example, at step 720 the phone number received at step 710 is marked. In this example, the number associated with phone $58_1$, 416 000-0001 is marked. Method 700 then advances from step 720 to step 730 where the common communication policy is accessed. In this example, step 730 is performed by accessing CP database 100 maintained on cell-phone $50_1$.

Next, at step 740 the common policy is updated with the marked identifier. In this example, CP database 100 is first examined to determine whether the marked number of phone $58_1$, the originator phone, is present in CP database 100. In this case, the phone number 416 000-0001 is not present in CP database 100 meaning that accepting a phone call from phone $58_1$ is permissible. Accordingly, CP database 100 is updated by inserting the marked number 416 000-0001 such that calls from phone $58_1$ are now impermissible according to CP database 100. It should apparent to those skilled in the art that the steps of accessing and updating should not be construed in the limiting sense, and that in other embodiments the two steps could be combined to form one step.

Figure 8:
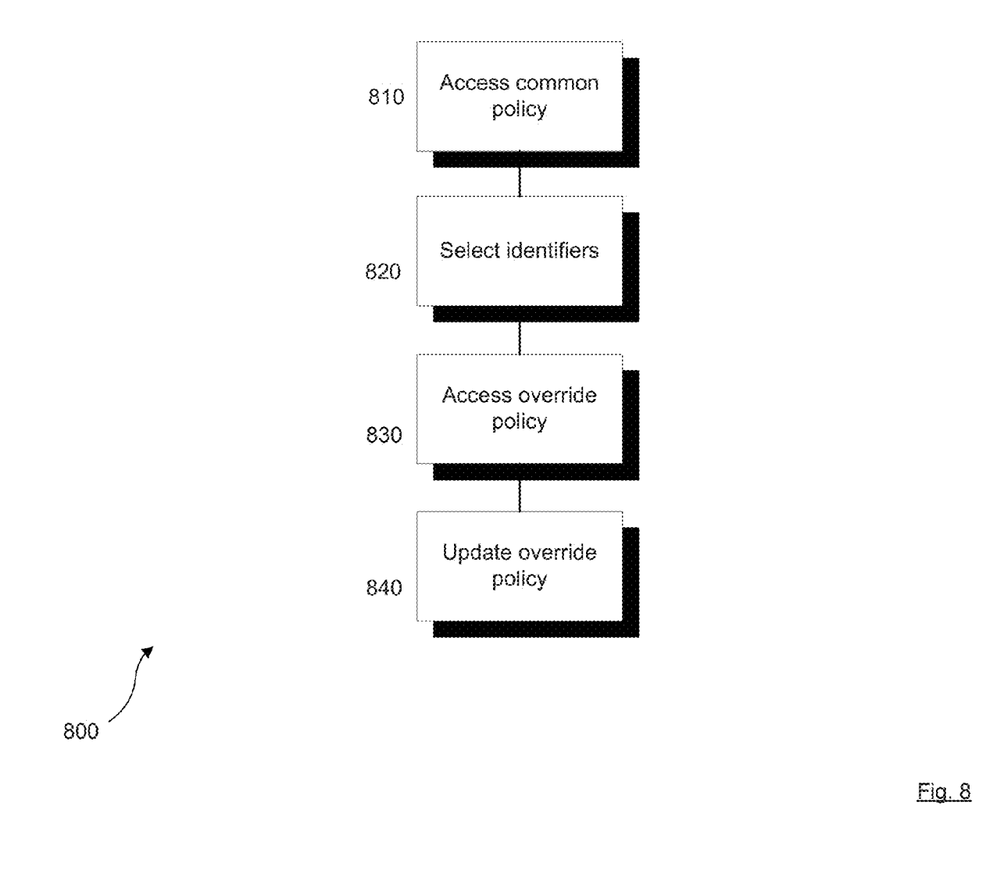
FIG. 8 is a flowchart depicting a method of updating information in accordance with an embodiment of the invention.

In another embodiment of the invention, as shown in FIG. 5 and discussed above, individual cell-phones can maintain override policies for overriding a policy common to all cell-phones. Referring to FIG. 8, a method for updating an override policy for an individual cell-phone which is part of a network having a common communication policy is indicated generally at 800. In order to assist in the explanation of the method, it will be assumed that method 800 is operated using system 30a. In addition, it is assumed that, immediately prior to the performance of Method 800, CP database 100a's contents are as shown above in Table I, and OP database 110a's contents are as shown above in Table II. Furthermore, the following discussion of method 800 will lead to further understanding of system 30a and its various components. (However, it is to be understood that system 30a and/or method 600 can be varied, and need not work exactly as discussed herein in conjunction with each other, and that such variations are within the scope of the present invention).

Referring back to FIG. 8, at step 810 a common communication policy is accessed. In this example, step 810 is performed on cell-phone $50a_1$ by accessing CP database 100a maintained on cell-phone $50a_1$.

Next, at step 820 one or more identifiers are selected. In this example, the identifier CP database 100a is first examined to identify the numbers it contains, and following that, 416 000-0002, one of the phone numbers present in CP database 100a, is selected from the list of numbers first identified. Next, at step 830, the override policy is accessed. In this example, step 830 is performed by accessing OP database 110a maintained on cell-phone $50a_1$.

Next, at step 840, the override database is updated. In this case, OP database 110a is updated by inserting the selected number 416 000-0002. In one embodiment, the override policy is an opt-out policy. Accordingly, by updating the OP database in step 840 to include 416 000-0002 cell-phone $50a_1$ ignores the common policy, and makes calls from phone $58a_2$ permissible. In another embodiment, the override policy can be an opt-in policy. Accordingly, by updating the OP database in step 840 to include 416 000-0002 cell-phone $50a_1$ follows the common policy, and in accordance with the common policy, receiving calls from phone $58a_2$ becomes impermissible.

While only specific combinations of the various features and components of the present invention have been discussed herein, it will be apparent to those of skill in the art that subsets of the disclosed features and components and/or alternative combinations of these features and components can be utilized, as desired. For example, although GSM and AMPS are wireless communication methods contemplated, it should now be apparent that other wireless communication methods such as the Code Division Multiple Access ("CDMA") for digital connections and the Total Access Communication System ("TACS") for analog connections are all within the scope of the invention. Other methods include General Packet Radio Service ("GPRS"), and Orthogonal Frequency Division Multiplexing ("OFDM"), amongst others. In another variation, wired network of subscriber devices such as PSTN can also be used.

In a further variation, yet other communication methods such as Ethernet and Voice over Internet Protocol (VoIP) could also be used. Moreover, identifiers other than phone numbers and serial numbers can also be used. For example, when employing Ethernet communications, the Internet Protocol (IP) address assigned to each device can be used as an identifier. Alternatively Media Access Control (MAC) address of each device could also be used. In yet other variations, policies could be applied to a group of devices by using an identifier that represents that group of devices. For example, when using IP addresses as identifiers, only the first 24 bits of an IP address could be used to identify 256 devices at a time, applying policies to all of those devices at once through the use of a single identifier.

In another variation it is possible to maintain CP database 100 of system 30 at base stations 34 rather than at cell-phones 50. For example, a cell-phone 50 can be operable to access CP database 100 in system 30 by communicating with a base station 34.

In yet another variation, each cell-phone 50 could maintain a copy of CP database 100, and update its copy when in range of a base station 34. According to this variation, a cell-phone 50's copy of CP database 100 could be updated using different methodologies. For example, the transfer of CP database 100 could be made selectively, transferring the database only when a difference is found between CP database 100 maintained on the base station and the copy maintained on a cell-phone 50. It should now be apparent that a variety of different methods could be employed for determining a difference. For example, each field of CP database 100 can be compared to the equivalent field of the copy maintained on an individual cell-phone 50 to determine whether there are any differences. Alternatively, sizes of the database files or the date of modification of these files could be compared. Moreover, the comparison can be done either by the base station 34, cell-phone 50 or some other computer trusted with maintaining synchronized CP databases between the base stations and the roaming devices. All these methods, and other methods for determining whether a CP database should be transferred to cell-phone 50 are within the scope of this invention.

In another variation, CP database 100 can be updated through a peer-to-peer connection between cell-phones 50. It should now be apparent that this peer-to-peer connection can take the form of a wired connection such as a Universal Serial Bus ("USB") connection, a cross-linked peer-to-peer Ethernet connection, or a wireless connection such as a Bluetooth connection, an infrared ("IR") connection, or a peer-to-peer IEEE 801.11b/g connection. In yet another variation, database 122 could be updated through a Local Area Connection ("LAN") to which both cell-phone 50 and at least one base station 34 are connected.

In other variations, the policy can be stored in forms other than a database such as a lookup table. Moreover, the policy can be stored at a computer other than one at base station 34. For example, the policy can be stored on routers and other dedicated computing devices. Also, the policy could be stored on a computer or other electronic device which is operated by an entity other than the office that operates the mobile devices.

In yet another variation, information from other sources besides incoming phone calls can be used for updating CP policy database 100. For example, phone numbers of unwanted callers can be identified from public sources such as web sites, and entered into CP database 100 manually. Moreover, the selection of which numbers to enter into CP database 100 can be done by either users of cell-phones 50, operators of base stations 34, some other third party operator entrusted with maintaining CP database 100, or some combination thereof Furthermore, any entries into CP database 100 made by the user of a cell-phone 50 may be subject to further verification prior to becoming available to all cell-phones 50.

Another variation of the invention could employ different types of subscriber devices in place of cell-phones. It should now be apparent that these subscriber devices can take the form of enhanced personal digital assistants such as those manufactured by Research In Motion Limited of Waterloo, Ontario, Canada, and PalmOne, Inc. of Milpitas, Calif. USA. In yet another variation policies could be used for other communication types besides voice calls, such as text messaging.

While portions of the foregoing description may individually reference systems 30 and 30a, it should now be apparent that all or parts of each of these systems can be combined as appropriate or otherwise desired. Accordingly, those of skill in the art will recognize that when certain references are made to one of these systems, and/or its components, such teachings can also be applicable to other ones of those systems.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A subscriber device in a network having a plurality of subscriber devices, comprising:
    an interface operable to receive communications;
    storage for maintaining a common policy and an override policy for overriding the common policy;
    a microcomputer connected to the interface and the storage, the microcomputer configured to:
        access the common policy, the common policy having an identifier such that a communication addressed to the subscriber device and having the identifier is rejected;
        mark the identifier from the common policy; and
        in response to the marking, update the override policy with to the marked identifier.

2. The subscriber device of claim 1 wherein the override policy is an opt-out policy; the microcomputer configured to update the override policy such that the communication having the identifier is not rejected at the subscriber device.

3. The subscriber device of claim 1 wherein the override policy is an opt-in policy; the microcomputer configured to update the override policy such that the communication having the identifier is rejected at the subscriber device.

4. A non-transitory computer readable medium storing computer readable instructions executable by a microcomputer to perform a method of updating an override policy maintained in a subscriber device for overriding a common policy in a network having a plurality of subscriber devices, the method comprising:
    accessing the common policy at the subscriber device; the common policy having an identifier such that a communication addressed to the subscriber device and having the identifier is rejected;
    marking the identifier from the common policy; and
    in response to the marking, updating the override policy with the identifier.

5. The non-transitory computer readable medium of claim 4 wherein the override policy is an opt-out policy, and the updating is performed such that the communication having the identifier is not rejected at the subscriber device.

6. The non-transitory computer readable medium of claim 4 wherein the override policy is an opt-in policy, and the updating is performed such that the communication having the identifier is rejected at the subscriber device.

* * * * *